United States Patent [19]

Stripling et al.

[11] 3,797,782

[45] Mar. 19, 1974

[54] MISSILE LAYING DEVICE

[75] Inventors: William W. Stripling; Harold V. White; Joe S. Hunter, all of Huntsville, Ala.

[73] Assignee: The United States of America as represented by the Secretary of the Army, Washington, D.C.

[22] Filed: Feb. 1, 1973

[21] Appl. No.: 328,796

[52] U.S. Cl. .................. 244/3.16, 356/149, 350/16
[51] Int. Cl. .......................................... F41g 11/00
[58] Field of Search ........... 244/3.16, 3.17; 350/16, 350/26; 356/148, 149, 248, 250

[56] References Cited

UNITED STATES PATENTS 3,612,643 10/1971 Weber ................................ 350/16
3,742,770 7/1973 Flannelly ............................ 350/16
3,552,216 1/1971 Pasquet............................... 350/16
3,310,877 3/1967 Slater................................. 356/149

*Primary Examiner*—Benjamin A. Borchelt
*Assistant Examiner*—J. V. Doramus
*Attorney, Agent, or Firm*—Edward J. Kelly; Herbert Berl; William P. Murphy

[57] ABSTRACT

A device including an arm with proximal and distal ends, a telescope, a connector disposed in pivotal relation between the proximal end and the telescope and provided with a mechanism in engagement between the telescope and arm for intersection of the distal end and the axis of said telescope during rotation thereof.

3 Claims, 3 Drawing Figures

MISSILE LAYING DEVICE

SUMMARY OF THE INVENTION

A ballistic missile including a level platform with an axis and a mirror in parallel relation thereto is disposed with the platform axis within 7½° of a target azimuth by means of a compass (normal accuracy of the compass). The ballistic missile is limited to inflight corrections of 35 minutes of target azimuth misalignment.

The missile laying device is disposed with the proximal end in the axis of a north seeking apparatus and the connector and arm in aligned normal relation with the platform axis as determined by autoreflective relation of the telescope and the mirror.

The angular error between the platform axis position and the target azimuth is determined from the gyro apparatus and the telescope is rotated through an angle $\beta$ proportionate to the angular error for normal relation of the telescope axis with the target azimuth. The platform axis is finally rotated into the target azimuth and normal relation with the telescope axis as determined by autoreflective engagement thereof with the mirror.

DESCRIPTION OF THE PREFERRED EMBODIMENT

Figure 1:
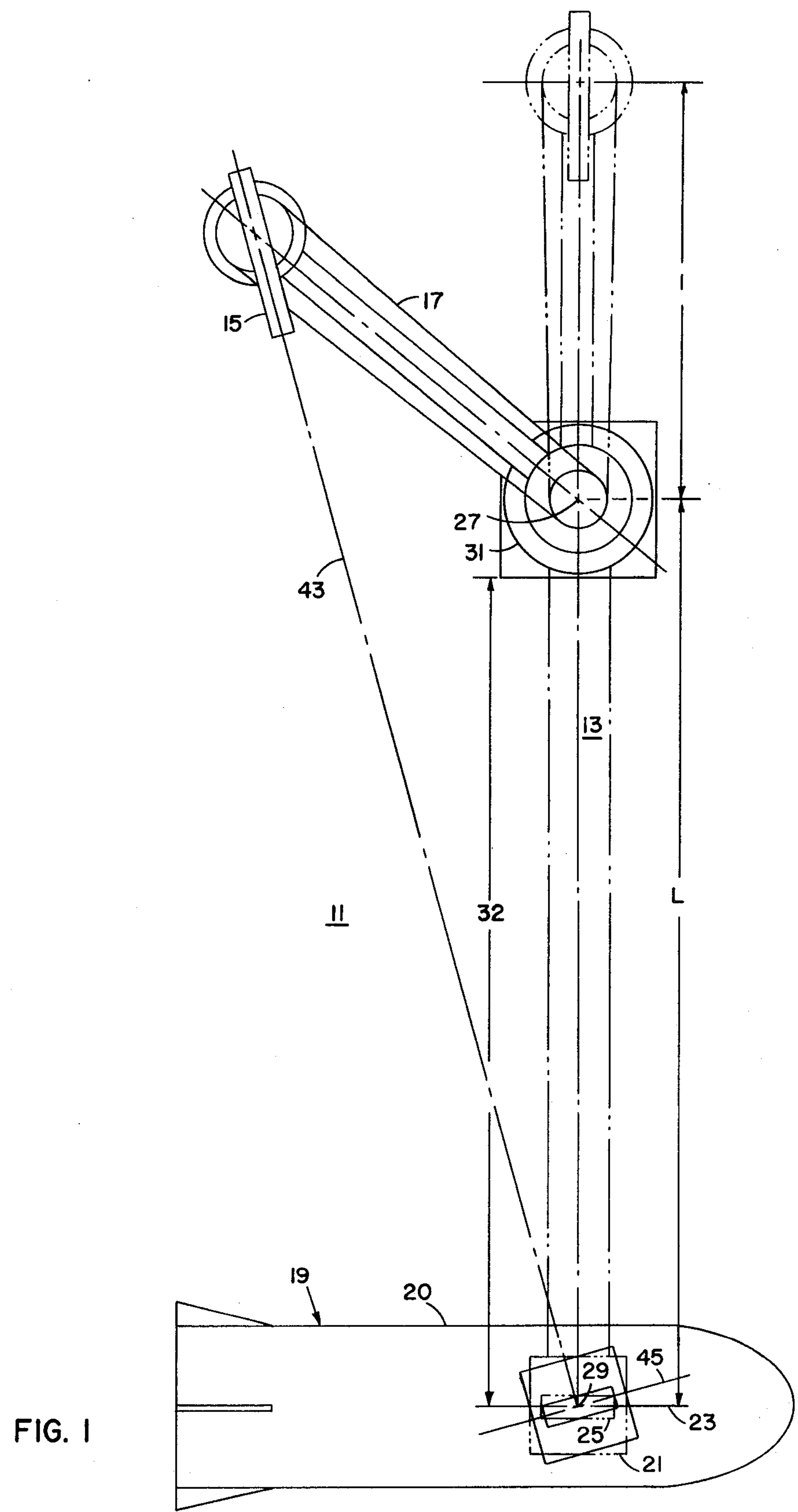
FIG. 1 is a view of the laying device in engagement with a ballistic missile.
Figure 2:
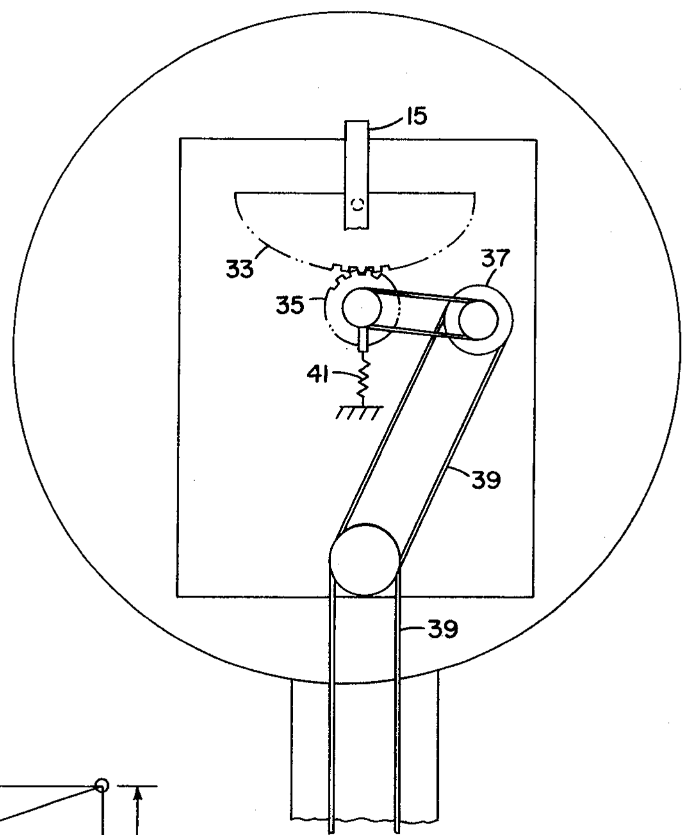
FIG. 2 is a cutaway view of the connector.

A laying device 11 is provided with an arm 13 having a length L and a telescope 15 with a connector 17 having a length 1 in pivotal engagement therebetween. A ballistic missile 19 with shell 20 is provided with a level platform 21 having an axis 23 and a mirror 25 parallel to axis 23.

Connector 17 and arm 13 of the laying device are disposed for aligned normal relation with axis 23 as determined by autoreflective alignment of telescope 15 with mirror 25 and with proximal and distal ends 27 and 29 of arm 13 in respective engagement with the axis of a north seeking gyro device 31 and stable platform axis

23. In most cases a portion 32 of arm 13 is deleted to provide virtual intersection of distal end 29 with axis 23 and prevent interference of arm 13 with shell 20 of the missile. Variable gear 33 is secured to telescope 15 and a spur gear 35 in rotatable engagement with arm 13 through pulleys 37 and belts 39 is biased by spring 41 into engagement with variable gear 33.

Variable gear 33 is disposed for coincidence of axis 43 of telescope 15 with distal end 29 during revolution of telescope 15.

Figure 3:
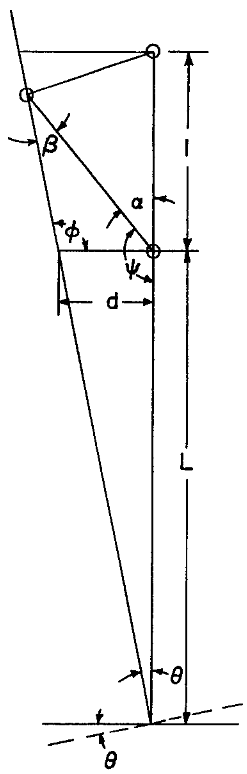
FIG. 3 is a graphic illustration of the laying problem.

In FIG. 3, $\alpha + \psi = 180°$ $\psi = 180° - \alpha$ $\theta + \beta + \psi = 180°$ $\theta + \beta + 180 - \alpha = 180°$ $\theta + \beta = \alpha$ $\tan \theta = d/L;\ d = L\tan \theta$ $d/\sin \beta = 1/\sin \phi$ where $\phi = (180 - [180 - (90 + \theta)]) = 90 + \theta$ $\sin \beta = d \sin (90 + \theta)/1 = L \tan \theta \sin (90 + \theta)/1 = L/1 \tan \theta \cos \theta$ $\sin \beta = L/1 \sin \theta$ $\beta = \sin^{-1}[L/1 \sin \theta]$

OPERATION

Telescope 15 is rotated through angle $\beta$ from the alignment position for normal relation of axis 43 of telescope 15 with target azimuth 45, and level platform 21 is rotated to autoreflective alignment of mirror 25 with telescope axis 43 to complete the laying of missile 11 to within 3½ minutes of target azimuth 45.

We claim:

1. A ballistic missile laying device comprising an arm with proximal and distal ends, a telescope, and a connector pivotally disposed between said proximal end and said telescope and provided with a mechanism in engagement with said arm and said telescope for intersection of the axis thereof with said distal end during rotation of said telescope.

2. A device as in claim 1 with said mechanism comprising a variable gear secured to said telescope and a spur gear disposed in rotational engagement with said arm and journaled in said connector for spring biased engagement with said variable gear.

3. A device as in claim 2 with a portion of said arm deleted to provide a virtual distal end of said arm.

* * * * *